United States Patent
Butt

(10) Patent No.: US 7,258,289 B1
(45) Date of Patent: Aug. 21, 2007

(54) COMBINATION FOOD CUTTING, STORAGE, AND SHREDDER APPARATUS

(76) Inventor: Muzammal Butt, 2906 Rockingham Ct., Pasadena, MD (US) 21122

( * ) Notice: Subject to any disclaimer, the term of this patent is extended or adjusted under 35 U.S.C. 154(b) by 49 days.

(21) Appl. No.: 11/039,326

(22) Filed: Jan. 19, 2005

(51) Int. Cl.
  *A47J 43/25* (2006.01)
(52) U.S. Cl. .......... 241/30; 241/95; 241/100; 241/101.1
(58) Field of Classification Search ............ 241/101.2, 241/100, 101.1, 95, 30, 25; 99/537; 83/167, 83/932
  See application file for complete search history.

(56) References Cited

U.S. PATENT DOCUMENTS

| | | | |
|---|---|---|---|
| 1,974,194 A * | 9/1934 | Phillips | 241/101.1 |
| 2,026,691 A * | 1/1936 | McArdle et al. | 241/101.1 |
| 4,077,685 A | 3/1978 | Scire | 312/246 |
| 4,307,843 A * | 12/1981 | Loiseau | 241/93 |
| 6,026,972 A | 2/2000 | Makowski | 220/495.08 |
| 6,148,704 A | 11/2000 | Lewis | 83/167 |
| 6,722,241 B1 * | 4/2004 | Anayas | 83/459 |

* cited by examiner

*Primary Examiner*—Mark Rosenbaum
(74) *Attorney, Agent, or Firm*—Goldstein Law Office, P.C.

(57) ABSTRACT

A combination food cutting, storage and shredder apparatus, having a cutting board and storage box containing a knife drawer and a garbage disposal drawer. A shredder is positioned just above the garbage disposal drawer and just below the cutting board for holding scraps and peelings left over from the cutting board for disposal. The storage box also contains an outwardly extending knife sharpener.

7 Claims, 3 Drawing Sheets

COMBINATION FOOD CUTTING, STORAGE, AND SHREDDER APPARATUS

BACKGROUND OF THE INVENTION

The invention relates to a cutting board, and more particularly, to a combination food cutting, storage, and shredder apparatus for safely storing knives therein and conveniently holding scraps and peelings left over from the cutting board for disposal.

Cooks of the house want small appliances that are easy to use and a contemporary modern kitchen is packed with all types of electrical appliances. Even such basic items as bottle openers and shredders are now available in electrically operated versions. Manufacturers are even producing refrigerators, dishwashers, microwaves and ovens that are integrally tied into home networking systems through the internet for allowing remote operation. Electronic key pads on refrigerator doors allow you to organize calendars, keep a grocery list and order groceries online. Even though all these new kitchen appliances are being used, there are still few essential kitchen device that are not electrically operated. One such device is the cutting board. Just about all kitchens utilize cutting boards for cutting fruits, meats, and vegetables.

U.S. Pat. No. 6,026,972 to Makowski discloses a debris receptacle attachment for a cutting board comprising a bag-holding frame attached to a "U" shaped backstop and a holding plate. U.S. Pat. No. 4,077,685 to Scire discloses a cutting board with a sliding and completely removable storage board underneath it. U.S. Pat. No. 6,148,704 to Lewis discloses a vegetable cutting device with a turntable integrated onto the board by means of a perpendicular shaft that runs through the center of the bottom surface.

While these units may be suitable for the particular purpose employed, or for general use, they would not be as suitable for the purposes of the present invention as disclosed hereafter.

SUMMARY OF THE INVENTION

It is an object of the invention to produce a means for cutting vegetables and food thereon, while safely storing knives therein and conveniently holding scraps and peelings left over for disposal. Accordingly, the invention is a combination food cutting, storage, and shredder apparatus, having a cutting board for safely cutting food thereon and a storage box for storing knives therein and conveniently holding scraps and peelings left over from the cutting board for disposal.

It is another object of the invention to provide a means for conveniently removing peelings and shreddings from a cutting board. Accordingly, the invention includes a garbage disposal drawer which extends outwardly from the storage box and conveniently allows a user to brush food scrapings from the cutting board therein while still utilizing the cutting board.

It is another object of the invention to provide a convenient means for collecting shredded food. Accordingly, the garbage disposal drawer is positioned directly below the shredder, and when in use the shredded food drops conveniently into the garbage disposal drawer for holding until use, thereby preventing a messy counter surface.

It is another object o the invention to provide a means for easily sharpening knives. Accordingly the storage box of the invention includes a knife sharper affixed thereto for conveniently sharpening knives thereon.

This invention is a combination food cutting, storage and shredder apparatus, having a cutting board and storage box containing a knife drawer and a garbage disposal drawer. A shredder is positioned just above the garbage disposal drawer and just below the cutting board for holding scraps and peelings left over from the cutting board for disposal. The storage box also contains an outwardly extending knife sharpener.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
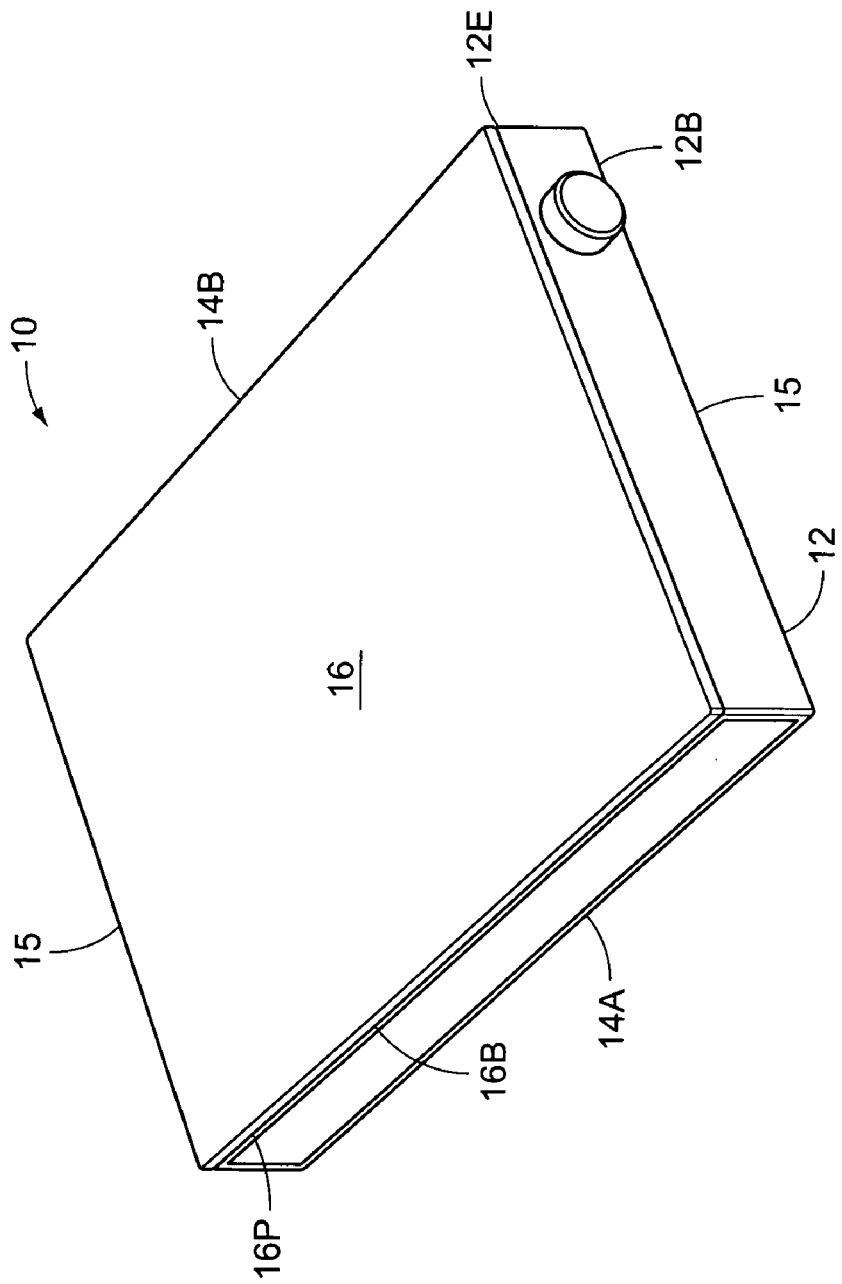
FIG. 1 is a diagrammatic perspective view of a combination food cutting, storage, and shredder apparatus of the present invention for safely storing knives therein and conveniently holding scraps and peelings left over from the cutting board for disposal.

FIG. 1 illustrates a combination food cutting, storage, and shredding apparatus 10 for safely storing knives therein and conveniently holding scraps and peelings left over from the cutting board for disposal.

The apparatus 10 includes a substantially rectangular storage box 12 having a top portion 12T, a top edge 12E, and a bottom portion 12B. The storage box 12 also includes a first side edge 14A and a second side edge 14B opposite one another, and two opposite fixed sides 15 therebetween. The apparatus 10 includes a substantially rectangular cutting board 16 having a bottom surface 16B and a perimeter 16P. The perimeter 16P of the cutting board 16 fits securely on top of the top edge 12E of the storage box 12.

Figure 2:
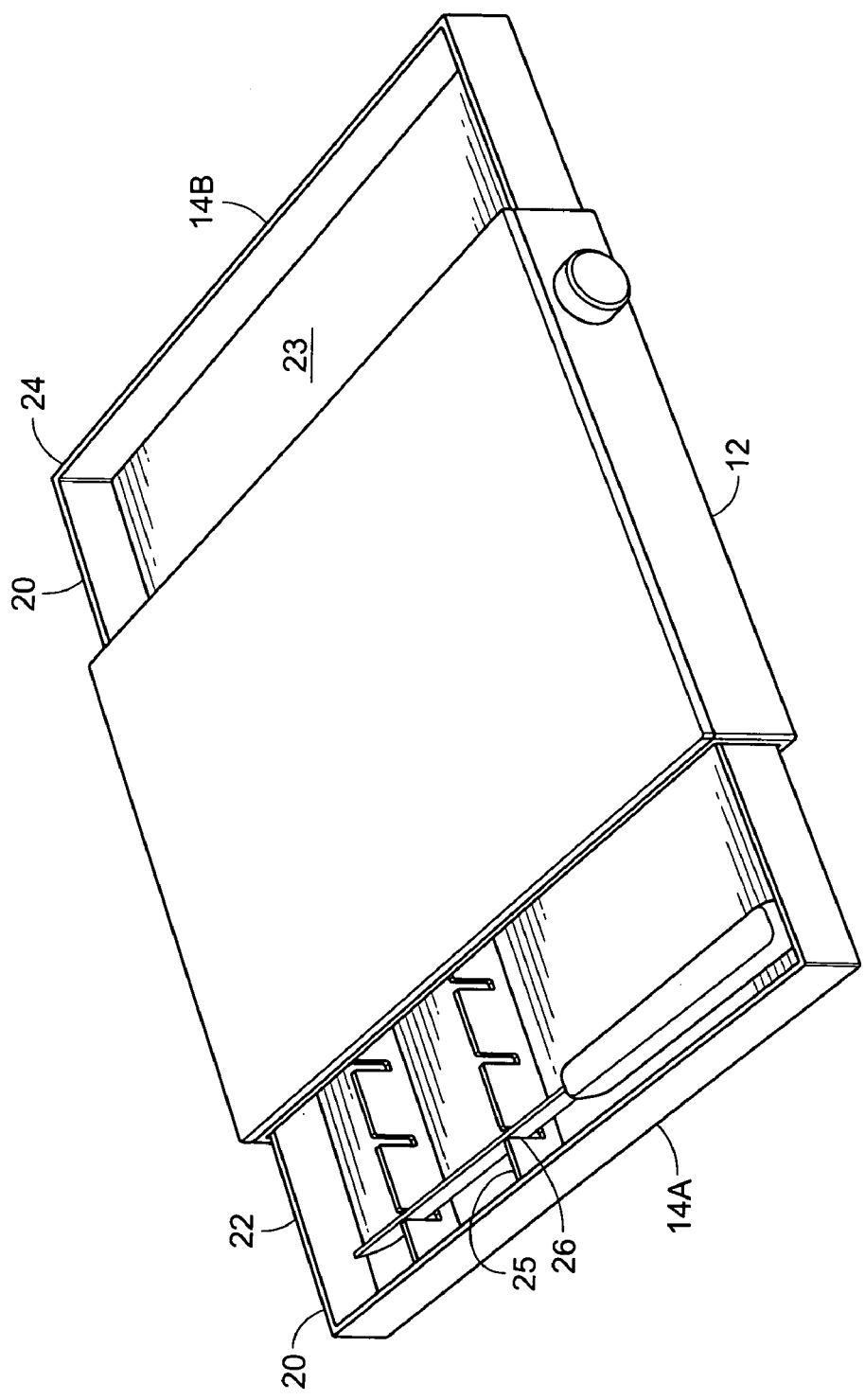
FIG. 2 is a diagrammatic perspective view of the combination food cutting, storage, and shredder apparatus of the present invention having an easily removeable garbage receptacle drawer and a knife drawer.

Referring to FIG. 2, the storage box 12 also includes a plurality of drawers 20 including a knife drawer 22, and a garbage disposal drawer 24. The first side edge 14A of the storage box 12 houses the knife drawer 22 which extends outwardly therefrom. The knife drawer 22 includes a plurality of elongated stands 25 having grooved slots 26 therein for securely housing sharp knives therealong. The second side edge 14B houses a garbage disposal drawer 24. The garbage disposal drawer 24 has a substantially empty receptacle 23 and is used to collect peelings and shreddings for disposal therein.

Figure 3:
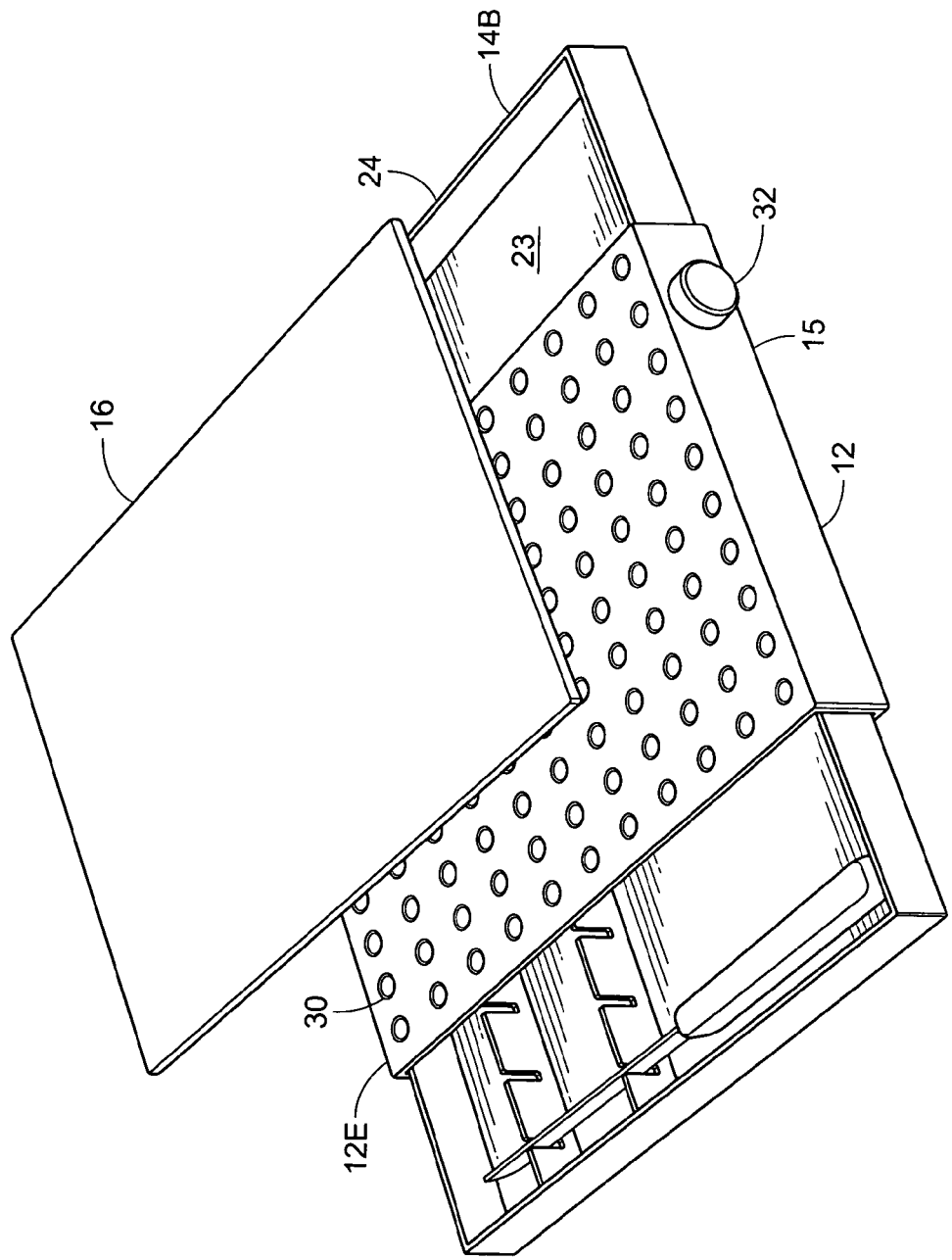
FIG. 3 is a diagrammatic perspective view of the combination food cutting, storage, and shredder apparatus of the present invention having a shredder located just bellow the cutting board.

A shredder 30, substantially rectangular, is also included within the storage box 12 just underneath the cutting board 16 and is illustrated in FIG. 3. When the cutting board 16 is removed from the top edge 12E of the storage box 12 the shredder is exposed for use, as shown. The shredder 30 is positioned just above the garbage disposal drawer 24 within the storage box 12, such that shreddings can easily fall through the shredder and into the receptacle 23 of the garbage disposal drawer 24 for being gathered up and held therein until eaten. This would prevent countertops from becoming messy and would easily contain spreading of the shreddings. One of the fixed sides 15 of the storage box 12 includes a substantially circular knife sharpener 32 for added convenience.

In use, a user can easily place vegetables and food to be cut on the cutting board 16. Then the user can simply remove the knife drawer 22 and remove a knife therefrom for cutting and slicing the vegetables. The use pulls the garbage receptacle drawer 24 out from the storage box 12. Then, as the vegetables are cut and sliced the scrapings can easily be discarded into the garbage disposal drawer 24. The garbage disposal drawer 24 can be removed completely and contents disposed at any time. If a user needs to shred cheese or another such food item, the cutting board 16 is easily removed from the storage box 12, thereby exposing the shredder 30. The garbage receptacle drawer 24 is pushed back into the storage box 12. The shredder can be used as normal to shred the food directly into the garbage disposal drawer 24. The shredded food can easily collect within the garbage disposal drawer 24 for preventing a large mess. If at any time the user needs to sharpen a blade of a knife, they can easily do so by using the knife sharpener 32 on the side 15 of the storage box.

The storage box 12 is easily compacted for convenient transport and storage. The cutting board 16, shredder 30, knife drawer 22 and garbage disposal drawer 24 are all easily removable for cleaning.

In conclusion, herein is presented a combination cutting board, storage box, and shredder for safely storing knives therein and conveniently holding scraps and peelings left over from the cutting board for disposal. The invention is illustrated by example in the drawing figures, and throughout the written description. It should be understood that numerous variations are possible, while adhering to the inventive concept. Such variations are contemplated as being a part of the present invention.

What is claimed is:

1. A combination food cutting, storage, and shredding apparatus for safely storing knives therein and conveniently holding scraps and peelings left over from cutting, comprising:
    a substantially rectangular storage box having a top portion, a top edge, a bottom portion, a first side edge and a second side edge opposite one another, and two opposite fixed sides positionable therebetween, having a plurality of drawers including a knife drawer and a garbage disposal drawer, the knife drawer having a plurality of elongated stands having grooved slots therein for securely housing sharp knives therealong, the first side edge housing the knife drawer which extends outwardly therefrom, the garbage disposal drawer having a substantially empty receptacle for collecting peelings and shreddings therein and the second side edge housing the garbage disposal drawer which extends outwardly therefrom, and one of the fixed sides including a substantially circular knife sharpener;
    a substantially rectangular cutting board having a bottom surface and a perimeter which fits securely on top of the top edge of the storage box; and
    a substantially rectangular shredder positionable within the storage box just underneath the cutting board and above the garbage receptacle drawer, and being exposable for use when the cutting board is removed from the top edge of the storage box, shreddings easily fall through the shredder and into the receptacle of the garbage disposal drawer.

2. A combination food cutting, storage, and shredding apparatus for safely storing knives therein and conveniently holding scraps and peelings left over from cutting, comprising:
    a storage box having a top portion, a top edge, a bottom portion, a first side edge and a second side edge opposite one another, and two opposite fixed sides positionable therebetween, having a plurality of drawers including a knife drawer and a garbage disposal drawer, the first side edge housing the knife drawer which extends outwardly therefrom, the second side edge housing the garbage disposal drawer which extends outwardly therefrom;
    a substantially rectangular cutting board having a bottom surface and a perimeter which fits securely on top of the top edge of the storage box; and
    a shredder being positionable within the storage box just underneath the cutting board and above the garbage receptacle drawer.

3. The combination food cutting, storage, and shredding apparatus of claim 2, wherein the knife drawer has a plurality of elongated stands having grooved slots therein for securely housing sharp knives therealong.

4. The combination food cutting, storage, and shredding apparatus of claim 3, wherein the garbage disposal drawer has a substantially empty receptacle for collecting peelings and shreddings therein.

5. The combination food cutting, storage, and shredding apparatus of claim 4, wherein one of the fixed sides of the storage box includes a substantially circular knife sharpener.

6. The combination food cutting, storage, and shredding apparatus of claim 5, wherein the shredder is exposable for use when the cutting board is removed from the top edge of the storage box allowing shreddings to easily fall through the shredder and into the receptacle of the garbage disposal drawer.

7. A method of easily retaining food peelings and shreddings using a combination food cutting, storage, and shredder apparatus, having a cutting board, a storage box having a knife drawer holding knives having blades therein, and a garbage receptacle drawer, a knife sharpener attached to the storage box, and a shredder above the garbage receptacle drawer and below the cutting board, the steps comprising:
    removing a knife from the knife drawer and sharpening the blade along the knife sharpener;
    cutting vegetables and food by placing vegetables and food on the cutting board;
    pulling out the garbage disposal drawer and discarding the scrapings cut off with the knife directly into the garbage disposal drawer;
    shredding food and vegetables by pushing the garbage receptacle drawer back into the storage box and removing the cutting board and shredding using the shredder therebeneath and allowing scrapings to fall directly below into the garbage disposal drawer; and
    removing and discarding contents of the garbage disposal drawer.

* * * * *